United States Patent
Pirvu et al.

(10) Patent No.: US 9,785,408 B2
(45) Date of Patent: *Oct. 10, 2017

(54) SYSTEM AND METHOD OF CENTRALIZED RANDOM NUMBER GENERATOR PROCESSING

(71) Applicant: NOVOMATIC AG, Gumpoldskirchen (AT)

(72) Inventors: Bogdan Pirvu, Gumpoldskirchen (AT); Dariusz Pitulej, Gumpoldskirchen (AT); Dariusz Chyla, Gumpoldskirchen (AT)

(73) Assignee: NOVOMATIC AG, Gumpoldskirchen (AT)

( * ) Notice: Subject to any disclaimer, the term of this patent is extended or adjusted under 35 U.S.C. 154(b) by 67 days.

This patent is subject to a terminal disclaimer.

(21) Appl. No.: 14/765,474

(22) PCT Filed: Jan. 31, 2014

(86) PCT No.: PCT/EP2014/051972
§ 371 (c)(1),
(2) Date: Aug. 3, 2015

(87) PCT Pub. No.: WO2014/118352
PCT Pub. Date: Aug. 7, 2014

(65) Prior Publication Data
US 2015/0378683 A1 Dec. 31, 2015

Related U.S. Application Data

(63) Continuation-in-part of application No. 13/757,767, filed on Feb. 2, 2013, now Pat. No. 9,336,646.

(51) Int. Cl.
*G07F 17/32* (2006.01)
*G06F 7/58* (2006.01)

(52) U.S. Cl.
CPC ............ *G06F 7/58* (2013.01); *G07F 17/3223* (2013.01)

(58) Field of Classification Search
None
See application file for complete search history.

(56) References Cited

U.S. PATENT DOCUMENTS 6,249,009 B1 6/2001 Kim et al.
6,409,602 B1 6/2002 Wiltshire et al.
(Continued)

FOREIGN PATENT DOCUMENTS

EP 2339467 6/2011

OTHER PUBLICATIONS

International Search Report for PCT/EP2014/051972, Completed by the European Patent Office dated Mar. 13, 2014, 4 Pages.

*Primary Examiner* — Tramar Harper
(74) *Attorney, Agent, or Firm* — Brooks Kushman P.C.

(57) ABSTRACT

A networked gaming system and method with a central true random number generator ("TRNG") for generating random numbers ("RNs"). The RNs are supplied to electronic gaming machines ("EGMs") on a network and are used to determine game outcomes. The system and method are configured to gather requests for RNs from EGMs in batches that are coordinated by a server based gaming ("SBG") service where the SBG service receives RN requests from EGMs and routes the requests in batches to the central true random number generator request handler ("TRNGRH") service. The central TRNGRH service responds to the SBG service with a batch of RNs that are then distributed to the EGMs within an acceptable response time.

20 Claims, 10 Drawing Sheets

(56) References Cited

U.S. PATENT DOCUMENTS

| | | | |
|---|---|---|---|
| 6,533,664 B1 | 3/2003 | Crumby | |
| 6,749,510 B2 | 6/2004 | Giobbi | |
| 7,242,776 B1 | 7/2007 | Elliot | |
| 7,519,641 B2 | 4/2009 | Ribordy et al. | |
| 8,118,662 B2 | 2/2012 | Caputo et al. | |
| 2003/0100372 A1* | 5/2003 | Gatto | G07F 17/32 463/42 |
| 2004/0194087 A1 | 9/2004 | Brock et al. | |
| 2005/0054445 A1* | 3/2005 | Gatto | G07F 17/32 463/42 |
| 2007/0127718 A1* | 6/2007 | Ribordy | G06F 7/588 380/256 |
| 2008/0076525 A1* | 3/2008 | Kim | G07C 15/006 436/22 |
| 2008/0234041 A1* | 9/2008 | Berman | G07F 17/3244 463/27 |
| 2010/0121896 A1* | 5/2010 | Oram | H04L 9/0662 708/250 |
| 2010/0240440 A1* | 9/2010 | Szrek | G07F 17/3241 463/22 |
| 2012/0115583 A1* | 5/2012 | Presch | G07C 15/006 463/25 |
| 2013/0316789 A1* | 11/2013 | Warner | G07F 17/329 463/20 |
| 2014/0287816 A1* | 9/2014 | Homer | G06F 7/588 463/22 |
| 2015/0005048 A1* | 1/2015 | Kaiblinger | G06F 7/588 463/22 |

\* cited by examiner

SYSTEM AND METHOD OF CENTRALIZED RANDOM NUMBER GENERATOR PROCESSING

CROSS-REFERENCE TO RELATED APPLICATION

This application is the U.S. national phase of PCT Application No. PCT/EP2014/051972 filed on Jan. 13, 2014, which claims priority to U.S. patent application Ser. No. 13/757,767 filed on Feb. 2, 2013, the disclosures of which are incorporated in their entirety by reference herein.

COPYRIGHT

Portions of this disclosure contain material in which copyright is claimed by the applicant. The applicant has no objection to the copying of this material in the course of making copies of the application file or any patents that may issue on the application, but all other rights whatsoever in the copyrighted material are reserved.

BACKGROUND

Electronic gaming machines ("EGMs") offer a variety of games such as mechanical spinning reel games, video spinning reel games, video poker games, roulette games, keno games and other types of wagering games that are commonly deployed at a casino for use by players. Playing the EGMs typically requires the player to place a wager on the outcome of a game, whereby the outcome is determined by some random mechanism that in regulated markets must comply with the specifications published by the regulatory body.

Server based gaming technologies (e.g. Video Lottery with central random number generation of the type disclosed in Gaming Laboratories International, Inc. Standard Series entitled Client Server Systems GLI-21 v2.2 dated May 18, 2007, U.S. Pat. No. 6,409,602 and U.S. Pat. No. 6,749,510) are becoming more and more important in recent years as governments seek to gain as much control as possible over operations in the gaming industry. To this end the game results and financial transactions (pay-in, pay-out) must be stored centrally on systems networked to the individual electronic gaming machines ("EGMs") such that records are available in order to continuously monitor the various functions and outcomes of individual games and gaming activities.

There are different random number generator ("RNG") models in use with EGMs for generating random numbers ("RNs") during game play to determine game outcomes. One such technique is generation of RNs at a central server or computing system. This is a solution that simplifies the process of maintaining records of game play results in a single central location. Central RN generation also reduces the risk of security breaches that can occur if local RNGs are used. This is because in cases when the RNs are generated on each individual EGM and subsequently together with the game outcome transferred to the central server where the game history and the accounting data are stored, local manipulations of the RNG are theoretically feasible.

Historically, the first EGMs based on a modern microprocessor architecture have been equipped with so-called pseudo-RNGs: software algorithms that deterministically generate a series of numbers with the statistical properties of random series. Historical data related to the operation of the software based pseudo-RNG was maintained locally on the EGM, although as EGMs were connected to networks, it became possible to upload the data to a central server for tracking. In lottery applications, central pseudo-RNGs have been used where RNs are provided over a network to individual EGMs connected to the network. Data related to operation of the pseudo-RNGs was typically maintained in a central storage.

A problem with software based pseudo-RNGs is that they generate deterministic series of numbers which merely exhibit the statistical properties of random series but which are not truly random. This restriction means that in cases where true random series are a crucial requirement, a different type of RNG must be used: a true RNG ("TRNG") implemented in hardware where the randomness generation is based on physical processes. Usually, the main constraint of such TRNGs is that they do not produce random numbers on demand but instead they provide a more or less continuous stream of numbers. In cases where temporary storage of previously generated random numbers (real-time requirement) is forbidden, the TRNG stream must be accessed in an appropriate way in order not to overflow the server with requests. The present invention provides a means and method to implement a TRNG that optimizes the access times and computational resources in order to achieve operating speeds that are fast enough to supply RNs to a large network of EGMs while maintaining records of all RNs generated in a central database where they can be easily stored and verified. For this purpose, any kind of TRNG can be used. The present invention however, is explained in a context where a TRNG based on the quantum measurement of the spatial resolution of single photons, such as that, for example, described in U.S. Pat. No. 7,519,641 to Ribordy et al., incorporated herein by reference, which is referred to throughout the following description as Quantum HW. It should be understood that the present invention can be used to optimize the access to any other kind of TRNG such as, for example, that described in U.S. Pat. No. 6,249,009 to Kim et al., incorporated herein by reference, where a quantum measurement of single photons with respect to the time resolution is employed in order to generate the random stream.

BRIEF DESCRIPTION OF THE DRAWINGS

For a better understanding of the present invention, and to show more clearly how it functions, reference will now be made, by way of example, to the accompanying drawings. The drawings show embodiments of the present invention in which.

DETAILED DESCRIPTION OF THE INVENTION

Figure 1:
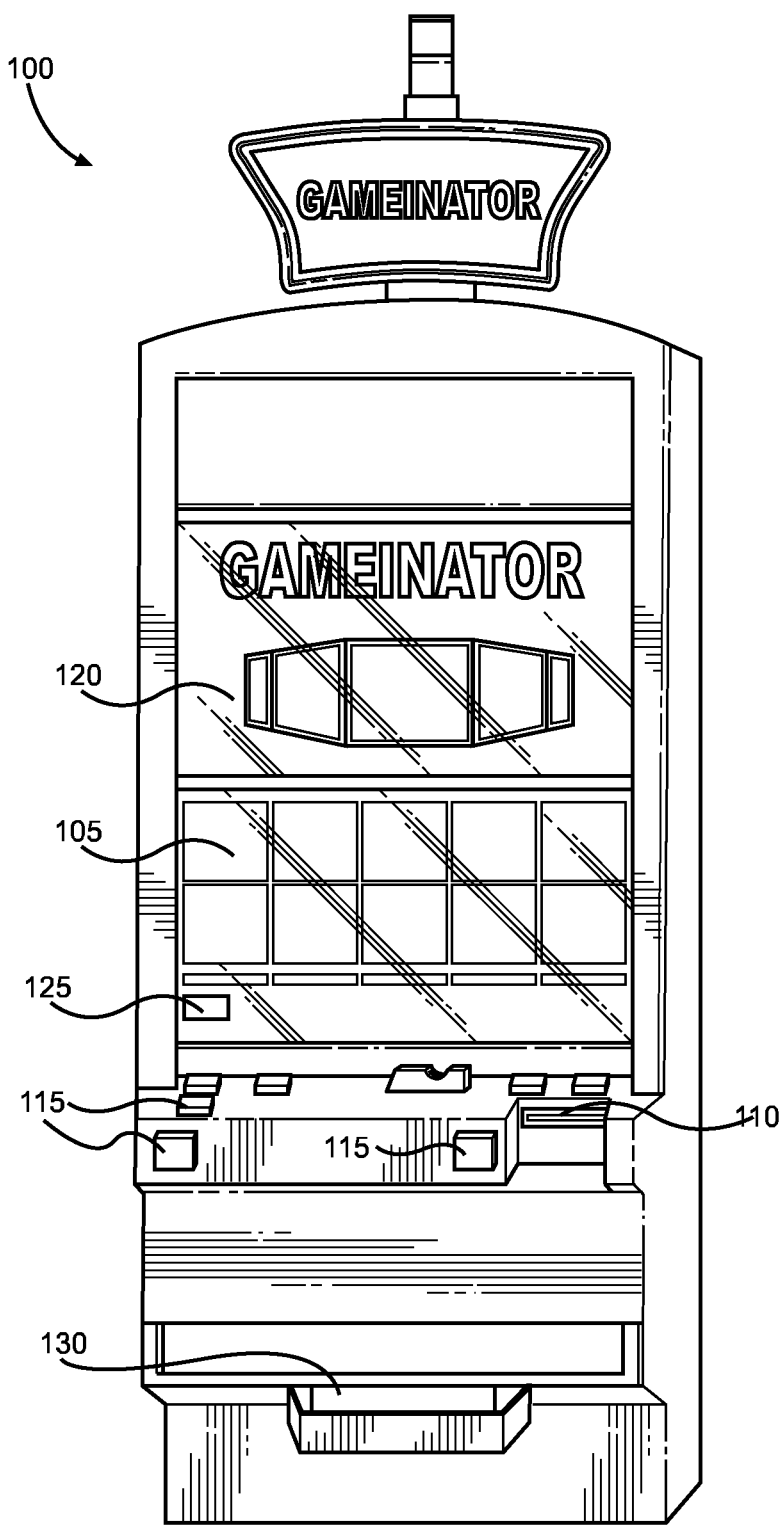
FIG. 1 shows an electronic gaming machine for playing a game of chance.

The present invention will now be described in more detail with reference to the accompanying drawings. It should be understood that the invention may be embodied in many different forms and should not be construed as limited to the embodiments set forth herein. Throughout FIGS. 1-9, like elements of the invention are referred to by the same reference numerals for consistency purposes.

FIG. 1 shows an electronic gaming machine ("EGM") 100 with a number of components. A primary display 105 is used to show game play and resulting outcomes, and may be in the form of a video display (shown), or alternatively, physical reels. Touch screen displays are included on most EGMs and provide a flexible interface for operation of EGM 100, including displaying symbols during game play. Other components include a bill validator (see FIG. 2) housed inside EGM 100 into which bills may be inserted through bill slot 110. Buttons 115 on the exterior of EGM 100 are used to initiate and control EGM operations in conjunction with touch screen display 105 by the player. EGMs may further include a secondary display 120 for displaying other game functions including bonus screens. Either of primary display 105 or secondary display 120 may be used to show information to the player such as pay tables, messages, advertising, entertainment screens or other types of information. Multiple meters 125 on display 105 are used for tracking credits available for play, amount won on a particular play, number of coins bet and other amounts are typically positioned near the bottom of screen 105. EGM 100 may also accept coins. In those cases, a coin tray 130 at the bottom of EGM 100 is used to catch coins as they are dispensed to a player.

It is common for EGM 100 to include a ticket-in, ticket-out ("TITO") component that includes a ticket reader and ticket printer housed inside of EGM 100 that may accept bar coded credits printed on a ticket through slot 110 and for which the value of the credits is displayed on meters 125 upon a ticket being inserted.

Figure 2:
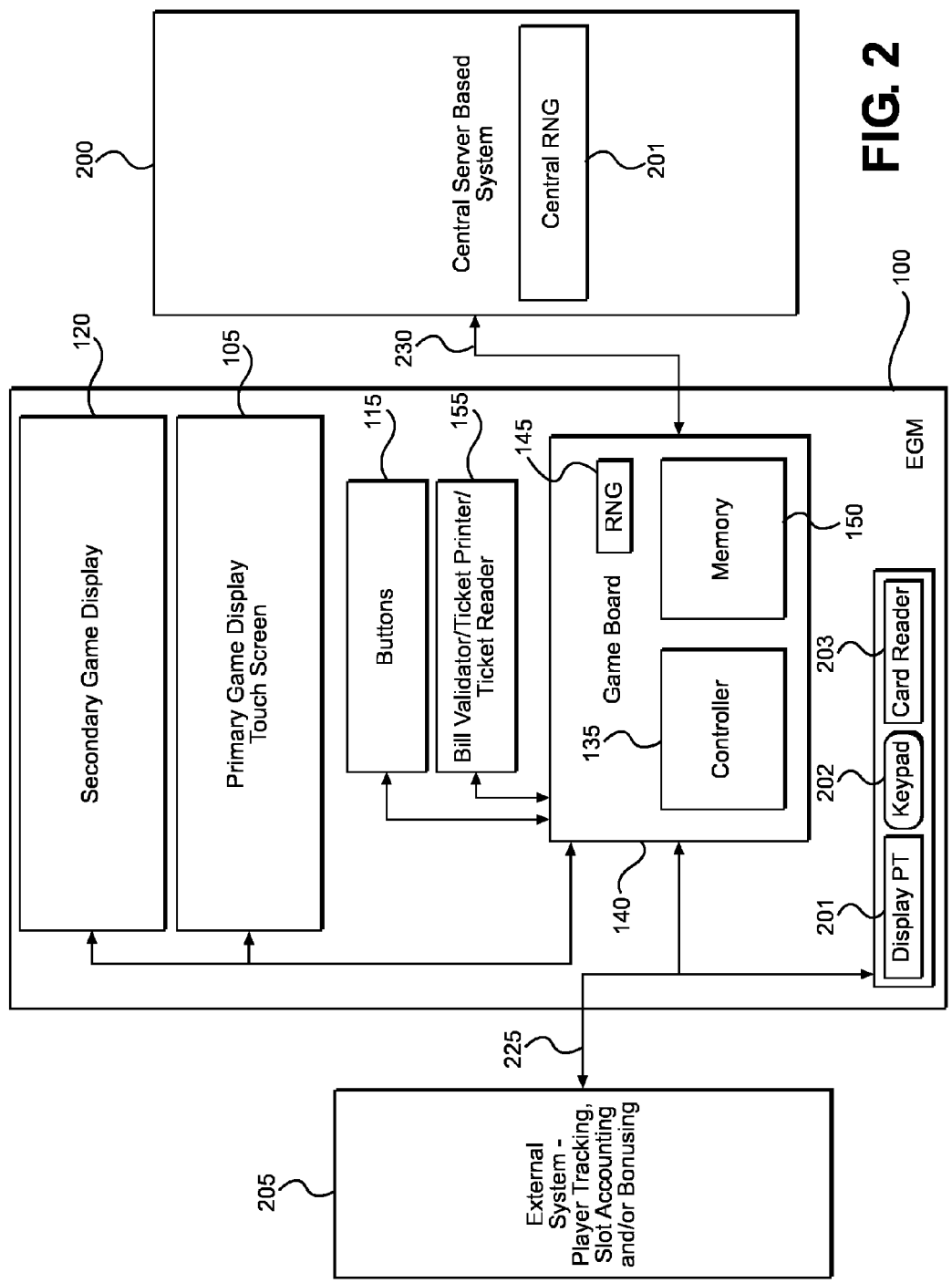
FIG. 2 shows a block diagram of an electronic gaming machine for playing a game and connected to a network controlled by a server based system including a central random number generator.

FIG. 2 is a block diagram of EGM 100 connected to a central server based system 200 and showing certain internal components of EGM 100 and central server 200. All operational functions of EGM 100 are controlled by a controller 135 such as a microprocessor housed inside EGM 100 that is resident on a game board 140. The controller executes instructions that include the operation of an EGM based random number generator 145 ("RNG"). The internal components of EGM 100 are well known to those of ordinary skill in the art. Game outcomes are determined either based on the random numbers selected by the local RNG 145 or on those selected by the central RNG 210. A bill validator 155 for accepting paper currency is shown integrated with a ticket reader and ticket printer. Bill validator 155 accepts currency in the form of bills or tickets from a player and adds credit to meters 125 on EGM 100.

An external system 205 such as a player tracking system, a slot accounting system or a bonusing system may also be connected to EGM 100. These types of systems are typically connected to EGM 100 either through a separate interface board (not shown) or directly to different components of EGM 100 including but not limited to game board 140. A player tracking system may also include other components installed in EGM 100 such as a player tracking display 201, a keypad 202 and a card reader 203. These components allow for direct interaction between external system 205 and the player to receive information from the player on keypad 202 or through information on a card inserted into card reader 203, and to display information to the player on display 201. A network is established between external system 205 and EGM 100 by network connection 225. The network may be connected to all EGMs 100 in a casino or any smaller subset of EGMs 100.

Server based system 200 is also connected to EGMs 100 by a network connection 230 which may be a separate connection or the same connection as the network connecting EGM 100 to external system 205. Server based system 200 may be a single server or it may represent a group of interconnected servers that are configured to be a single system interfacing with a group of EGMs. Central server 200 also includes a central random number generator ("central RNG") 210 that provides random numbers used by EGM 100 as well as other EGMs connected in a networked system of EGMs as shown in FIG. 3.

It will be understood that the type of network 230 over which data is communicated can be one of several different types of networks. These include a Local Area Network (LAN), Wide Area Network (WAN), an intranet, the internet or other classes of networks. Any type of network technology could be used without departing from the principles of the invention. This would include communication via any protocol on any of the layers of the OSI model (ISO/IEC 7498-1) with or without encryption (e.g. SSL encryption, VPN, etc). The time is synchronized on all components of the system via a network protocol such as, for example, network time protocol ("NTP") to ensure that time stamps may be reliably compared.

Figure 3:
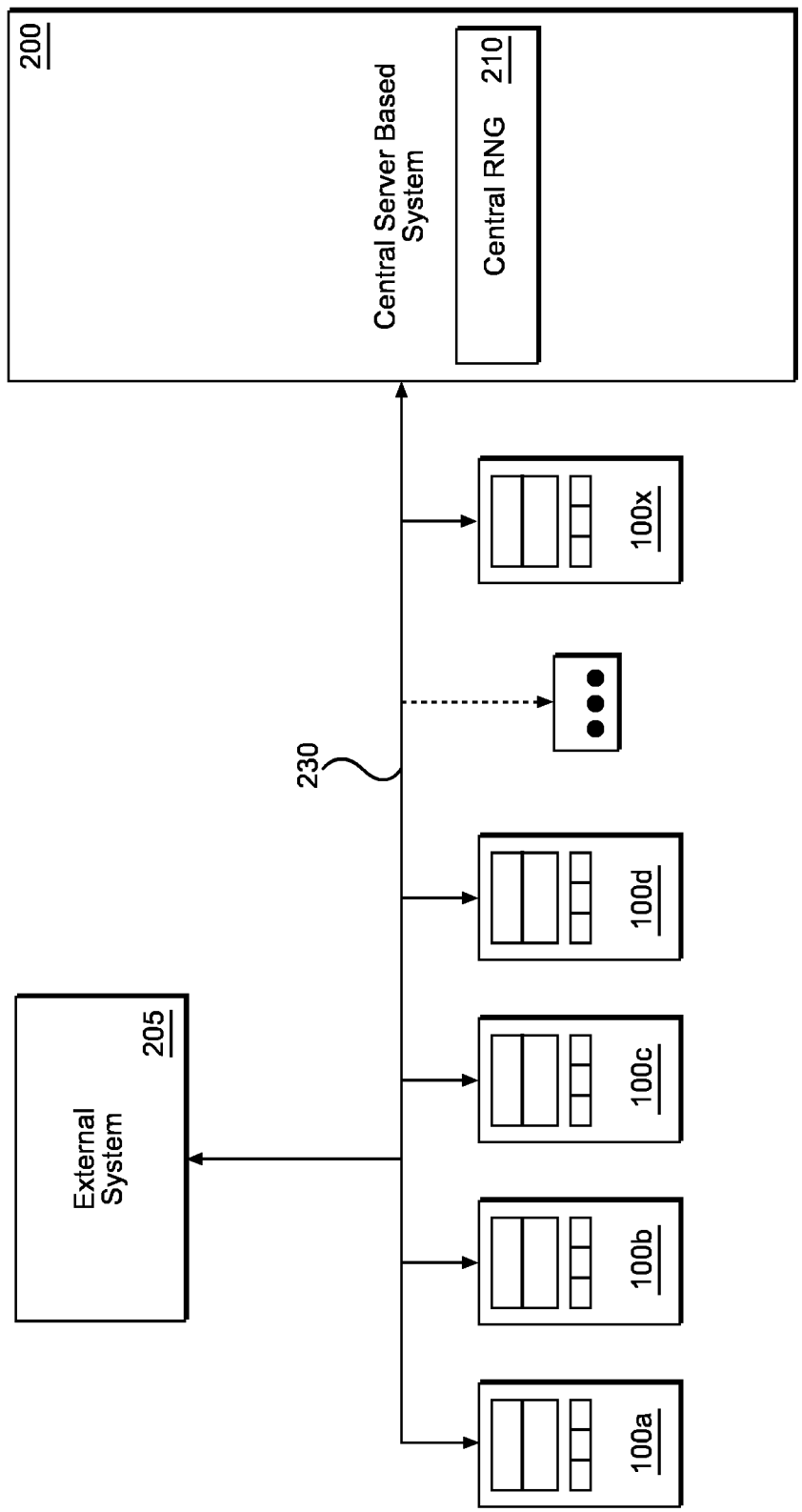
FIG. 3 shows a block diagram of a group of electronic gaming machines on a network connected to a server based system including a random number generator and an external system.

FIG. 3 is a block diagram showing a group of EGMs 100 $a$-$x$ on a network connection 230 between central server based system 200 and each of EGMs 100 $a$-$x$. It should be understood that the network may be set up with any number of EGMs that may number into the thousands of machines. Each of EGMs 100 $a$-$x$ is also connected to external system 205 that may be a player tracking, slot accounting, bonusing or other type of system. In the system of FIG. 3, central RNG 210 generates RNs for all EGMs 100$a$-100$x$ on network 230.

Figure 4A:
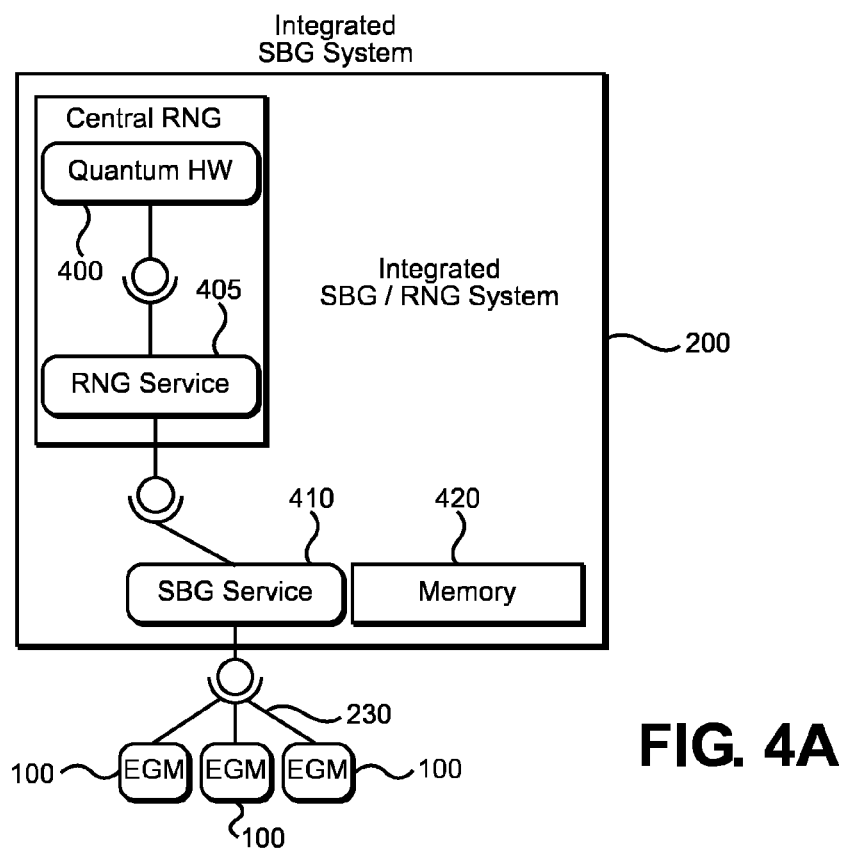
FIG. 4A is a block diagram showing an integrated server based gaming system where the SBG system and the RNG system components are running on one physical node in block diagram form.

FIG. 4A is a block diagram showing an integrated central server based system 200 with one RNG service 405 in block diagram form. A true RNG hardware component ("Quantum HW") 400 is used to generate RNs and those RNs are passed to the request handler service/("RNG") 405 that coordinates RNG requests coming from one or more SBG services 410.

Figure 4B:
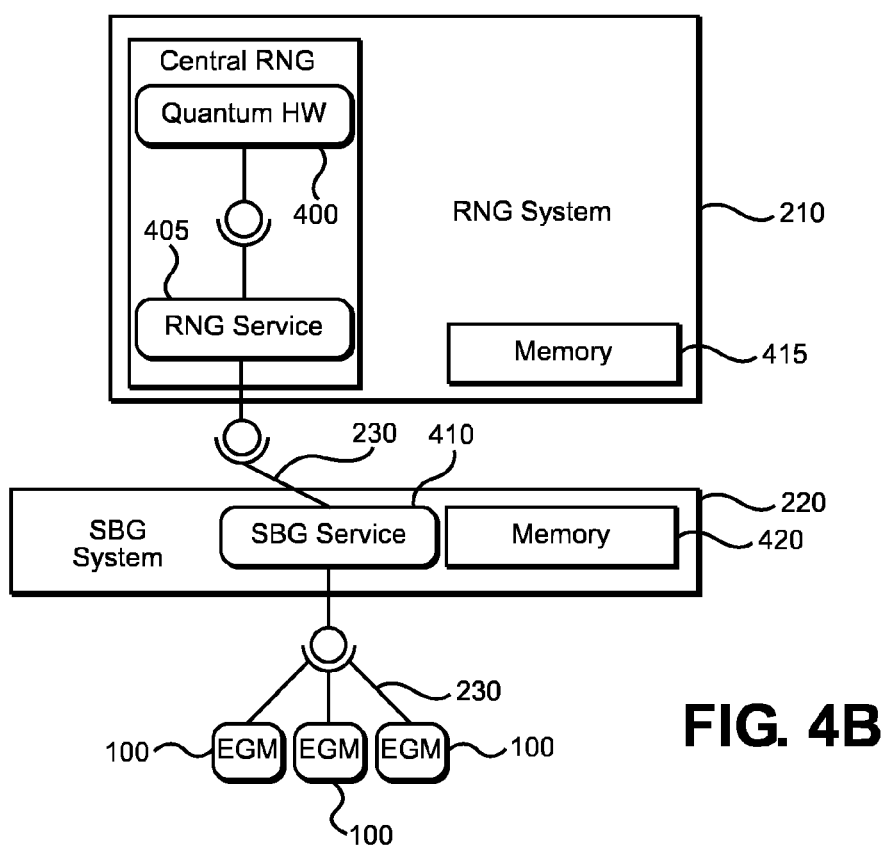
FIG. 4B is a block diagram of an alternative embodiment of a system configured as two separate subsystems running on different physical nodes where the SBG system is separate from the RNG system.

The SBG service 410 is the request handler for direct RN requests from EGMs 100 on network 230. SBG service 410 may run on the same node as the RNG service 405 or on one or more separate remote nodes depending on the number of EGMs connected to network 230. Configuring the system such that RNG service 405 and SBG service 410 run on the same computing device is preferred where RNs are being provided to a small number of EGMs operated by a single operator. In that configuration, the system will operate faster since the communication between RNG service 405 and SBG service 410 can be done at the level of inter-process communication on the same machine. However, there are two cases when multiple SBG service 410 must run on different machines: 1) The system contains a number of EGMs 100 larger than the maximum number that can be served by one SBG service 410 node; and 2) Different server based gaming operators that want to have strictly separated game history and accounting data have to share the same central RNG service 405. If the maximum number of EGMs is exceeded, SBG services nodes may be added to the system, and in fact, multiple SBG services 410 may be configured to optimize the speed of the delivery of large amounts of RNs when there are large numbers of EGMs on network 230. One or more SBG services 410 accessing the RNs generated by central RNG service 405 may be co-located with central RNG service 405, or in a remote server room separate from RNG service 405. A system configured with a separate SBG service 410 running on a node remotely from central RNG service 405 node is shown in FIG. 4B.

It should be understood that using an abstraction layer (SBG service 410) between the RN consumer (EGM 100) and the RN producer (RNG service 405) is not a requirement, but merely good practice from a software architecture point of view. In this way the scalability of the system is guaranteed in cases when EGMs 100 are added to the server based gaming system. Furthermore, the abstraction layer allows the usage of different RNG services that collect the random data from other types of TRNG devices or generate it themselves by using software algorithms (pseudo-RNG). This flexibility is one of the advantages of following the "separation of concerns" paradigm that is also guaranteed by such an abstraction layer.

Figure 4C:
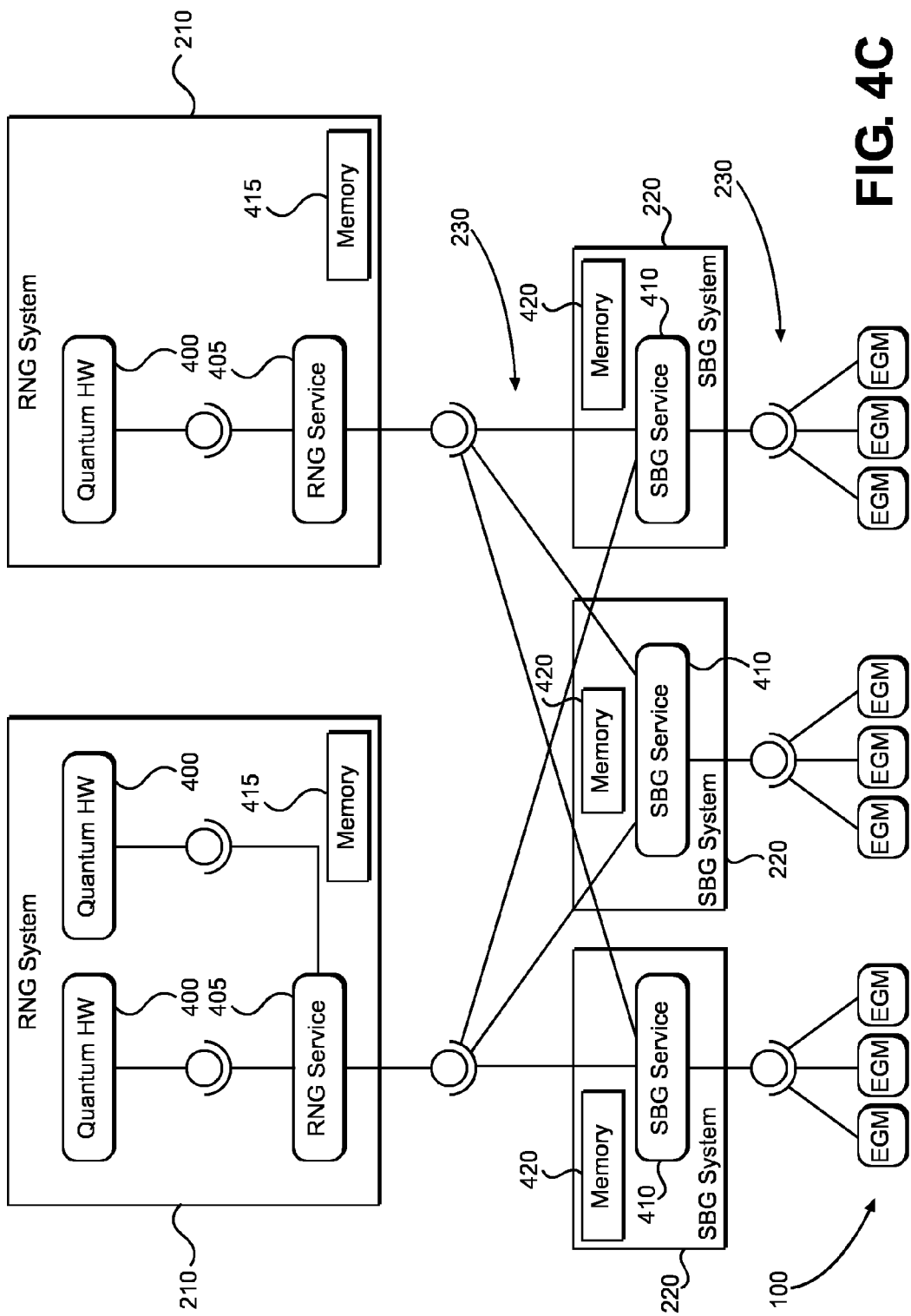
FIG. 4C is a block diagram of an alternative embodiment of a system configured with multiple separate physical nodes for the RNG and the SBG subsystems designed for horizontal scaling in order to balance the system load and eliminate bottlenecks.

In an alternative embodiment of the system with a large number of EGMs requiring large amounts of random numbers or where different server based gaming operators run strictly separated SBG systems 220, two central RNG systems 210 with multiple TRNGs input devices ("Quantum HW") 400 shown in FIG. 4C. It should be understood that the specific configuration represented in FIG. 4C, namely that one RNG service 405 is connected to two Quantum HW components 400 while the other only to a single Quantum HW component 400 is merely a visualization of a more general n-to-m relationship between the RNG services 405 and Quantum HW components 400. Generally the specific deployment model must be customized to the specific installation such that all regulatory and software quality requirements (like performance, availability, security, etc.) are fulfilled.

It should be understood that the software architecture described here allows full flexibility with respect to the choice of the communication pattern between the individual components. The specific choice is always made in the context of a given deployment such that it takes all regulatory and desired software quality requirements into account.

For example, the communication between the SBG service and the RNG service may follow either the Request-Response (SBG service pulls RNs from the RNG service) or the Publish-Subscribe (RNG service pushes RNs to the SBG service) pattern. The Publish-Subscribe pattern leads to a better performance on the SBG service node, since in this case RNs are always available when they are needed and the SBG service does not have to request them explicitly. However this kind of communication might be unwanted in certain legislations where temporary storage of the RNs on the SBG service node might be not allowed. In such a case the Request-Response pattern would be used and every RN that arrives at the SBG service would be used to answer a specific EGM request.

The choice of the communication protocol between the individual components of such a system must also be made taking into consideration various requirements of the specific deployment. Generally, in order to reduce the communication overhead and increase the performance, binary protocols can be used. If performance is not an issue, human-readable protocols like XML or JSON can be used.

It should be understood that a record of RNs generated by central RNG service 405 in the configurations of FIGS. 4A, 4B and 4C can be stored for verification in a memory 415. An additional SBG service node memory 420 can be used to store all RNs provided by each SBG service 410 to the EGMs 100, such that full traceability of the games played on EGMs 100 is guaranteed. Such a memory may either be a single memory for all SBG services 410 or multiple memories where each SBG service 410 has its own corresponding memory.

Figure 5:
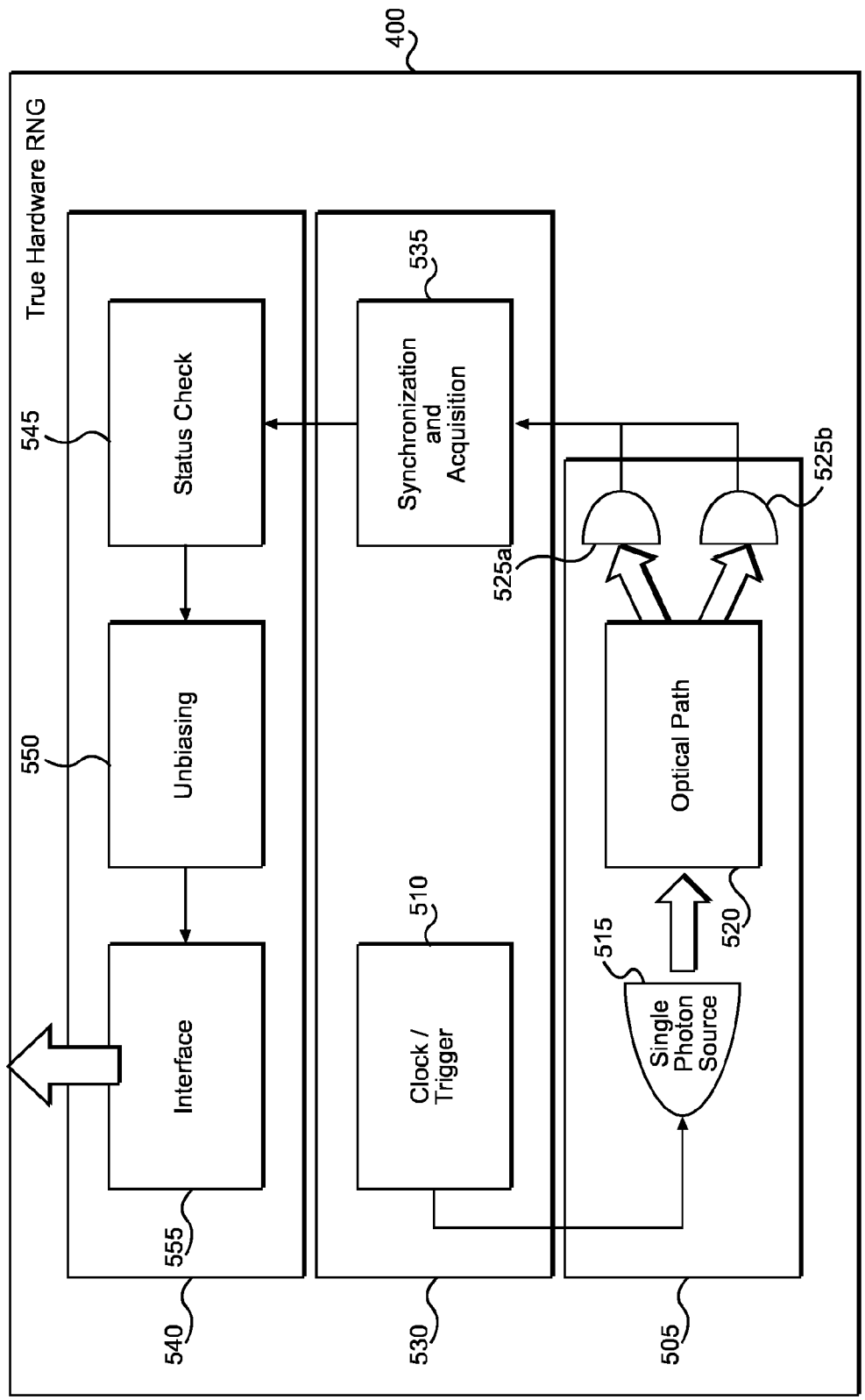
FIG. 5 is a block diagram of a true hardware RNG based on the measurement of the random arrival of a single photon at one of two detectors.

Quantum HW 400 is shown in further detail in FIG. 5. Quantum HW 400 is a block diagram of a hardware true random number generator consisting of three subsystems. The first subsystem 505 is the core of TRNG 400 and includes the optical elements used to implement the random process and reduce the random numbers for the game outcomes. A clock 510 is used to produce pulses that trigger operation of a light emitting diode 515 to produce photons that are the basis of a transmission element where the random event takes place. Photons produced by the single photon source 515 traverse an optical path 520 that can (but may not necessarily) contain optical elements like mirrors and beam splitters before they reach one of two single photon detectors 525a, 525b, each with single-photon resolution. These are configured to detect photons and record the outcomes in form of a bit stream that is a sequence of zeros and ones depending on which detector had a signal.

The second subsystem is an optical subsystem 530 that is controlled by a synchronization and acquisition electronic circuit 535. This subsystem comprises clock and triggering electronics 510 for single photon source 515, as well a synchronization and acquisition electronic circuit 535 connected to single-photon detectors 525.

A processing and interfacing subsystem 540 performs statistical and hardware checks at check circuit 545, as well as unbiasing of the sequence at circuit 550. Subsystem 540 also shapes the output electronic signals at interface circuit 555 before delivering a RN for use by system 200.

An advantage of a quantum random number generator 400 as described is that it is based on a simple and fundamentally random process that is easy to model and monitor. Processing unit 540 performs a live verification as it is functioning. It continuously checks that the light source and the two detectors are working correctly, and that the raw output stream statistics are within certain predefined boundaries. A status bit is output by processing unit 540. If all the conditions are fulfilled, this bit may be equal to 1. If one of the conditions is not fulfilled, the status bit may be set to 0 and the bit stream is inhibited. This feature results in a high level of accuracy and ensures the integrity of the process for generating the random numbers.

System 400 may be mounted on printed circuit boards (PCB) and packaged in a compact metal or plastic package. It may be designed as a USB device, a PCI card, PCI Express (PCIe) card or in other interface formats that can be installed in or with a computer. High-quality random numbers at speeds of approximately 16 Mbits/sec or more may be provided.

It should be understood that single photon source 515 for generating the single-photon may be based on a quantum dot structure. Implementing such a design allows for the simplification by omission of elements of status check 545 and unbiasing circuit 550 in processing sub-system 540.

There are two ways of providing RNs generated by RNG service 405 to each individual EGM 100. The first is to store all RNs that are generated (or a subset of those) on a temporary memory (e.g. RAM memory) or on a permanent memory (e.g. HDD or SDD memory) 420 before the RNs are required for use in determining the outcome of a game by a requesting EGM 100. As described with respect to FIG. 4B, this storage is associated with SBG server 410. Each request from an EGM to the SBG server 410 is satisfied instantly by accessing the permanent memory 420. In this type of solution it is recommended to design the communication between the RNG service 405 and the SBG service 410 according to the Publish-Subscribe communication pattern, in which the RNs are pushed by RNG service 405 to SBG service 410 as soon as they are available. This approach reduces the system load on the node where SBG service 410 is running, as it does not have to issue requests for RNs and it can choose to ignore messages published by the RNG service 405 if it has enough RNs in memory 420.

The second way to provide RNs generated by RNG service 405 to each individual EGM 100 is an approach that meets restrictions imposed by some jurisdictions that RNs must be provided to an EGM on a real-time basis. Under this approach, it is not permitted to store RNs permanently (storing RNs in a volatile memory like RAM memory for longer than needed in order to process the request is also regarded as permanent storage) anywhere on the path between RNG 400 and EGM 100. This is a security precaution taken so that it is not possible to manipulate the RNs in the path between RNG 400 and EGM 100 for the purpose of influencing or altering game results. In this case the communication between RNG service 405 and SBG service 410 must be designed according to the Request-Response communication pattern, in which the RNs are pulled by SBG service 410 from RNG service 405 as soon as they are needed.

This approach leads to a latency in the delivery of RNs to EGMs 100, which shall be referred to as $\Delta T$, between the time when the request for an RN is generated on EGM 100 (e.g. when the player pushes the start button) and the time when the RN is received for play on EGM 100. The existence of such a latency represents a disadvantage and the minimization of $\Delta T$ can be regarded in most cases as an important requirement for server based gaming systems.

It is common for regulators to establish a maximum value for $\Delta T$. However, the system designer may be further constrained with a $\Delta T$ that is less than the value established by the regulators in the situation where the system operator requires faster game play. In that case, the system operator may define a smaller value $\Delta T_{op}$, in order to improve the smoothness of game flow. As a result, the value of $\Delta T$ may be defined as the smaller of the two values (i.e. $\Delta T = \min(\Delta T_{reg}, \Delta T_{op})$) where $\Delta T_{reg}$ is the maximum value set for the jurisdiction by the regulators. It is in this situation, where real-time RN transfer is required, that the present invention is used to minimize $\Delta T$ and to permit the system to operate in a manner acceptable to the system operator and the player, and to comply with the regulatory requirements.

The operation of the system using the invention will now be described. For purposes of simplicity in the description, the system of FIG. 4B will be used which includes a single RNG service 405 and a single SBG service 410 running on different nodes, RNG system node 210 and a SBG system node 220. The description of the system of FIG. 4B will be followed by a description of FIG. 4C. It will be apparent that the main concepts apply equally to a system which includes multiple RNG services 405 and multiple SBG services 410 like the system of FIG. 4C.

FIG. 4B is a configuration in which a single RNG service 405 and a single SBG service 410 run on different nodes connected via a LAN or WAN, represented by network 230. Every request for a RN that is forwarded from SBG service 410 to RNG service 405 consumes computational resources on SBG service 410 until a RN is provided in response by RNG service 405.

In this scenario, RN requests from SBG service 410 to RNG service 405 stack up which may lead to memory overflow on SBG service node 220. Additionally each RN request initiated by SBG service 410 generates communication overhead that depends on the protocol that is used and that intrinsically reduces the bandwidth available for transmission of RNs from RNG system 210 to SBG system 220.

In the present invention, SBG service 410 transmits a batch of n RN requests to RNG service 405 to which RNG service 405 responds with a package of n answers. Providing RNs in batches reduces the communication overhead which is proportional to the number of single requests and thereby increases the system efficiency without changing any of the system parameters. At the same time, the risk of a memory overflow on the SBG service node 220 is reduced, since fewer requests are pending at any given time.

A problem raised by transmitting RNs in batches from RNG service 405 to SBG service 410 is that as the number of RNs (n) in a batch increases, the delay between a request for RNs from EGM 100 and the corresponding response increases. This may result in $\tau$, the response time for an individual EGM 100 request, becoming larger than $\Delta T_{reg}$ which would exceed the allowable delay as defined for real-time gaming systems for a particular jurisdiction. To address this issue, there exists an optimal batch size, $n_{opt}$, where $1 \leq n_{opt} \leq n_{max}$ is such that the resources allocated on SBG service node 220 are minimal while still fulfilling the real-time transmission requirement. $n_{max}$ represents here the maximal batch size, such that $\tau \leq \Delta T_{reg}$ is guaranteed.

In accordance with the invention, an adaptive algorithm is provided that takes into account the constant parameters and monitors the variable parameters in the system to compute the optimal batch size, $n_{opt}$, that minimizes the total resources allocated on SBG service node 220. The constant parameters in a 1:1 RNG-SBG service system are as follows:

$\Delta T$, the maximum allowable latency time between request and receipt of a RN on the EGM;

$R^{max}$ the maximum number of requests for a RN from SBG service 410 that can be pending simultaneously (i.e. at any given time) on SBG service 410; its magnitude is directly correlated to the total available resources divided by the resources needed by one open RN batch request;

$H^{max}$, the maximum number of requests from RNG service 405 to Quantum HW 400 that can be responded to per second;

$H^{max}_{bit}$, the number of random bits that can be generated by the Quantum HW 400 per second.

It should be noted that Quantum HW 400 can process requests only sequentially as the random bits are generated on a single physical device.

The dynamic parameters may depend on how the system is used (e.g. how often requests for RNs are generated on the EGMs) and cannot be changed by system logic. Their impact is important in optimizing the algorithm and they must be constantly monitored. These dynamic parameters are as follows:

$r_i$, the number of random bits requested in the $i^{th}$ RN request from EGM 100 to SBG service 410;

$t^E_i$ point in time when the the $i^{th}$ RN request from EGM 100 is sent to SBG service 410;

$t_i$, the latest allowed arrival time of the RNs for the $i^{th}$ RN request from EGM 100;

$\tau_i$, the expected response time interval for that request.

It should be noted that $t_i$ is computed by adding $\Delta T$ to the time $t^E_i$ when the corresponding request is being sent. $\tau_i$, on the other hand, can only be measured after a RN has been received by EGM 100. $\tau_i$ cannot be computed accurately before the transaction is completed, but can only be estimated roughly based on previous measurements and on the current load of the system.

Other dynamic parameters also exist in the system, the magnitudes of which are independent of the system load and cannot be influenced. These parameters may be, for example, related to the data connection quality. In particular, the network throughput between the EGM 100 with number j, and the SBG service node 220 is a dynamic parameter which will be denoted as $C^{ER}_j(t)$. The network throughput between SBG service node 220 and RNG service 410 will be denoted as $C^{RQ}(t)$. The values of both $C^{ER}_j(t)$ and $C^{RQ}(t)$ fluctuate over time and have a time dependency expressed by their argument t. Since they can be measured, one embodiment of the present invention monitors $C^{ER}_j(t)$ and $C^{RQ}(t)$ and takes them into account for the subsequent optimization. For purposes of simplifying this description, it will be assumed that the network throughput is large enough such that the effect of this limitation can be neglected, i.e. we can assume $C^{ER}_j(t)=C^{RQ}(t)=\infty$.

The primary parameters influencing system performance that can be steered by us are the batch size $n_k$ for request k on SBG service 410 and the corresponding time when the request is sent $T_k$. At any given time, it is likely that there will be several pending requests from one or more SBG service(s) 410 to RNG service 405 in parallel. The number of open requests from SBG services 410 will be represented as R(t). In order for the system to work properly (i.e. without overflow and without timeouts), $R(t) \leq R^{max}$ and $t^E_i + \tau_i \leq t_i$ must hold at any time.

With all of the relevant parameters defined, the optimal solution may be reduced to the following constrained optimization problem:

$$\min_{n_k, T_k} R(t, n_k, T_k, P(t)) \text{ subject to } t^E_i + \tau_i \leq t_i \text{(for all } i\text{)} \quad (1)$$

where the vector P(t) contains all static and dynamic parameters in the system.

Figure 6:
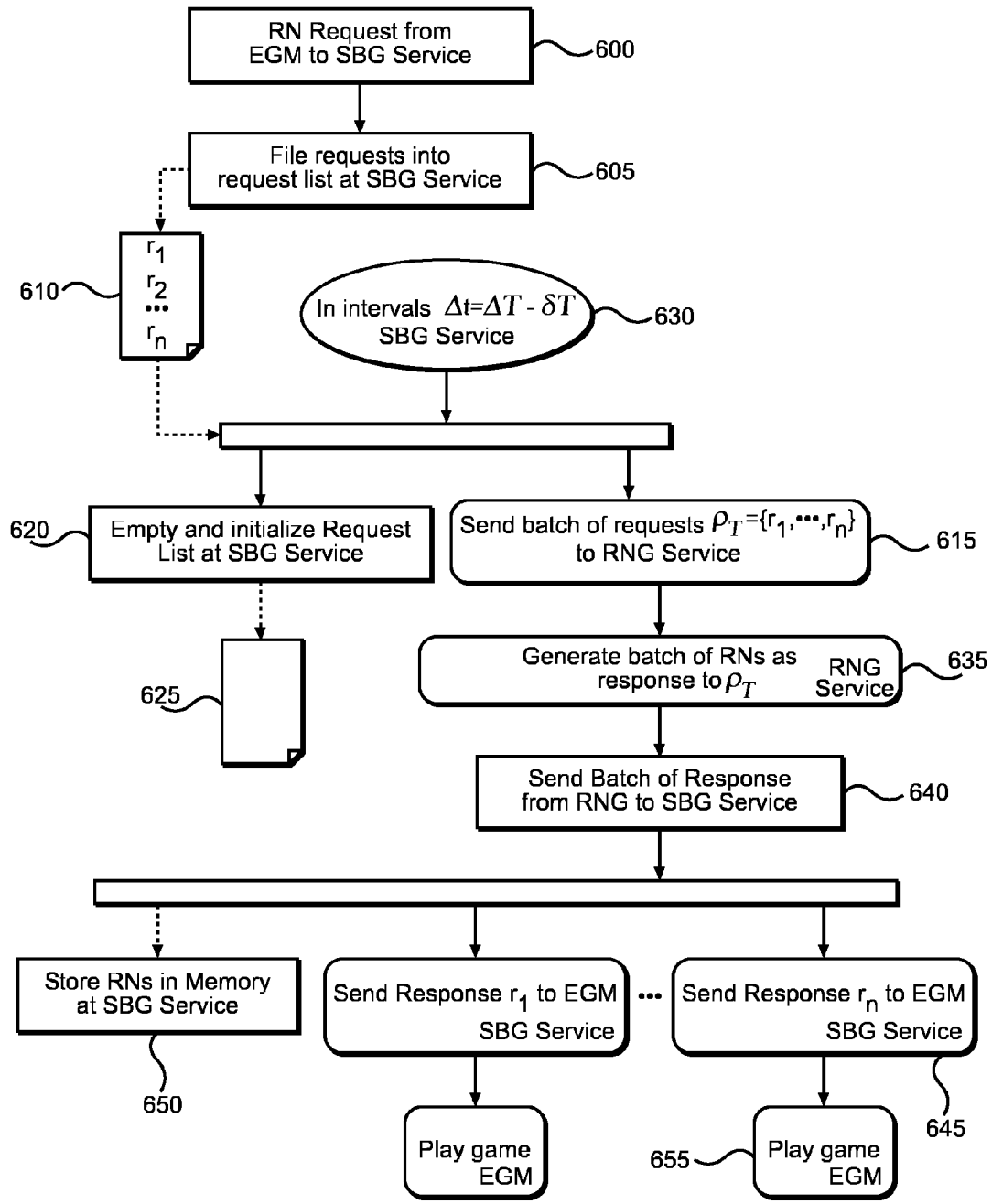
FIG. 6 is a flowchart showing a process for handling RN requests on a system with constant time interval request batching where the system has multiple EGMs, one RNG service and one SBG service.

Reference is now made to FIG. 6 which is a flowchart that provides a solution to a constant time interval batch of RN requests where the batch size $n_k$ is dependent only on a preconfigured batch interval $\Delta t$ in a system with one RNG service and one SBG service. This means that all requests sent by EGM 100 at step 600 arriving at SBG service 410 are filed into a request list represented as $r_1, r_2 \ldots r_n$ 610 at step 605 during the interval $\Delta t$. The batch of requests in request list 610 is forwarded as a single request to RNG service 405 at step 615. Once sent, request list 610 is emptied and reset to collect the next batch of requests received from EGMs at step 620 as represented by empty list 625. It should be understood that for the batch number k, the number of requests from the EGMs in request list 610 is batch size $n_k$ which may vary from batch request to batch request initiated by SBG service 410 to RNG service 405. At must be chosen such that $\Delta t \leq \Delta T - \delta T$ where $\delta T$ (630) is the expected time needed for responding to a request from an EGM if it is forwarded to RNG service 405 immediately without any delay by SBG service 410.

Finishing out the process, once request batch 610 is sent by the SBG service 410 and received at RNG service 405 at step 615, a batch of RNs is generated as a response at step 635 and sent back from the RNG service to the SBG service at step 640. The SBG service, in turn, sends individual responses back to EGMs for game play at step 645. The RNs can be stored at RNG system 210 on memory 415 as part of step 635 when they are generated. They can also be stored at SBG system 220 on memory 420 (step 650) in order to assure full traceability of all game plays on the EGMs 100. Once the RN is received, play of the game on EGM 100 at step 655 completes the process.

A system-wide expected time $\delta T$ can be determined by measuring the response time $r_i$ for a statistically significant number of directly forwarded EGM requests, such that it can be guaranteed that only some very small predefined percentage $\epsilon$ of the response times $r_i$ needs longer than $\delta T$ to be answered. As an example of how this could be achieved consider the following setup: the measurement of the $r_i$ reveals that $r_i$ is a random variable with a normal distribution (i.e. Gaussian distribution). By choosing $\delta T = \mu + 3\sigma$, we obtain $\epsilon = 0.135\%$ ($\mu \ldots$ mean of the distribution, $\sigma \ldots$ standard deviation of the distribution). Thus by first determining the distribution of the $r_i$ and then fixing the desired $\epsilon$, it is possible to uniquely determine $\delta T$. $\delta T$ can either be adjusted from time to time during the operation of the system via new measurements of the response times $r_i$, or fixed manually in the configuration of the system. In both cases the operator may want to increase the minimal $\delta T$ by a reasonable interval such as, for example, 50 to 100 ms, as a precautionary measure in the case of significant fluctuations in the system performance or data connection quality.

Once $\delta T$ is available, choosing $\Delta t \leq \Delta T - \delta T$ is the optimal choice for minimizing the resources required by SBG service 410. In this case $\delta T$ and implicitly $\Delta t$ must be readjusted every time the system changes (e.g. EGMs are added or removed) in order to guarantee smooth operation of the system.

Figure 7:
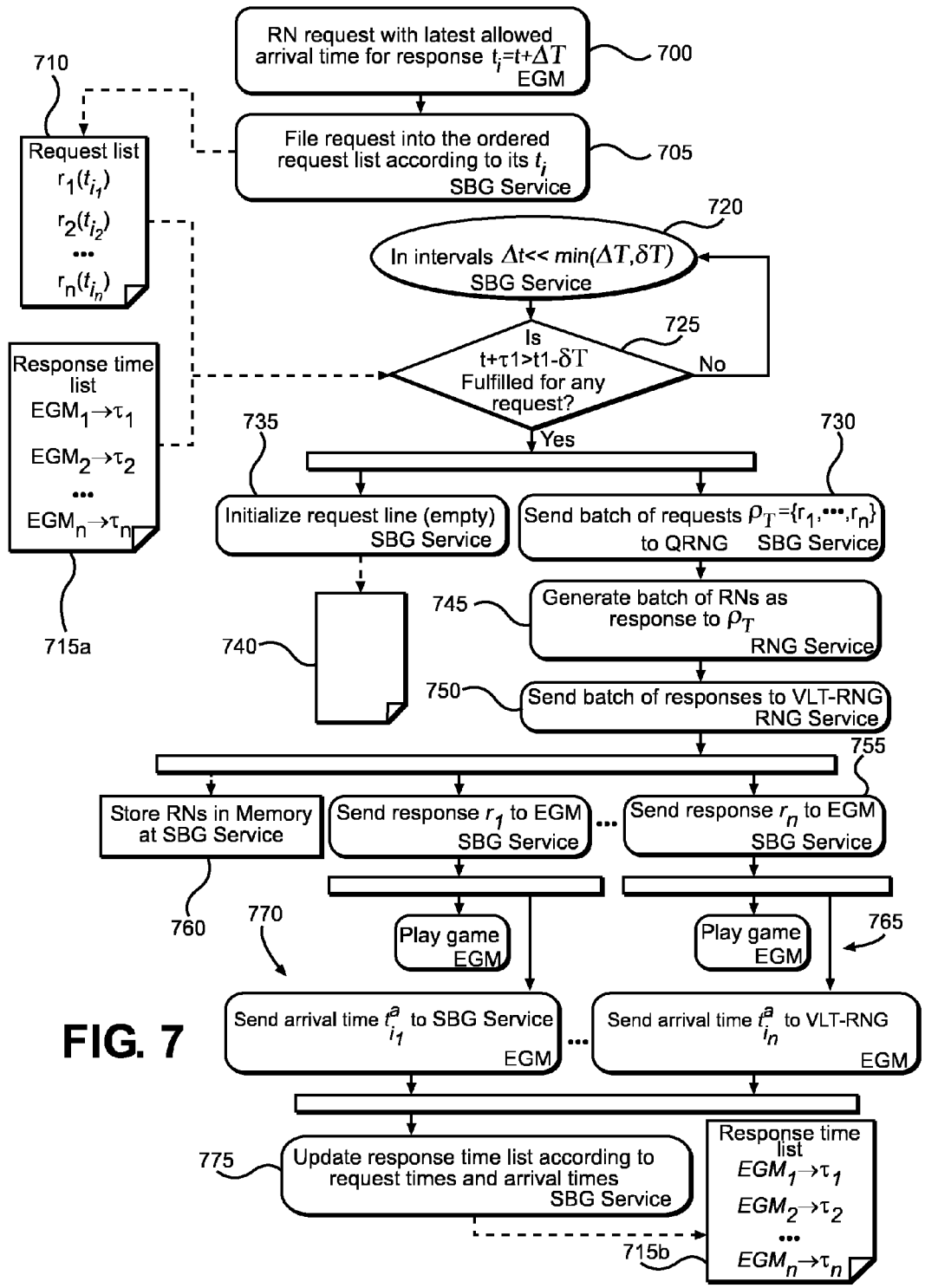
FIG. 7 is a flowchart showing a process for handling RN requests on a system with a variable time interval where the system has multiple EGMs, one RNG service and one SBG service.

Reference is made to FIG. 7 which is a flowchart that provides a solution based on variable time interval batching of RN requests where the batch size n is dependent on the batch interval $\Delta t$ in a system with one RNG service 405 and one SBG service 410. In this solution, the system is continuously monitored and any fluctuation in system performance or degradation of network connection quality causes the system to adjust and compensate for negative effects.

As in the earlier solution, the variable t is a running time variable (i.e. system clock). An important component of this process is to assemble a list of the expected response times, $\tau_i$, for each EGM in the system, which will be referred to as the response time list. This list is updated every time a request from an EGM 100 has been answered successfully, since only in this case $\tau_i$ can be computed as the time interval between the time when SBG service 410 request has been sent 730 and the time when the EGM 100 has received the RN 765. As can be seen in FIG. 7, the process starts at step 700 with a RN request being initiated by an EGM 100 where the latest allowable time for response is $t_i=t+\Delta T$. Each RN request is placed in an ordered request list according to its time, $t_i$ at step 705 where the request list 710 includes the list of RN requests represented by $r_1(t_i), r_2(t_i) \ldots r_n(t_i)$. Before the system is started up, the response time list is initialized with some reasonable estimated values that are less than $\Delta T$ at step 715*a*. Each request can be tagged either with its t value, or alternatively with the maximum allowed answer time $t_i=t+\Delta T$. Since $\Delta T$ is defined globally, both tags are equivalent. In very short intervals $\Delta t<<\min(\Delta T, \delta T)$, SBG service 410 parses the request list and checks whether:

$$t+\tau_i \geq t_i - \delta T \quad (2)$$

is fulfilled for any of the requests at step 720. $\delta T$ denotes a security margin defined by the operator of the system in order to cover any unexpected fluctuation in the system load and data connection quality where $\delta T$ is typically in the range of 50 to 100 ms.

Step 725 determines whether condition (2) holds true for any i. If so, all requests from the list are packaged in a batch of size n and transmitted as a batch request from SBG service 410 to RNG service 405 at step 730. In this way it is guaranteed that if the expected response time $\tau_i$ is not extended by more than $\delta T$, the security margin, all requests for a RN by an EGM are answered during the interval $\Delta T$. If the condition (2) does not hold, the process returns to step 720 until it does. During this loop additional requests are generated 700 and collected 705 in request list 710. Once sent, request list 710 is emptied at step 735, and reset to compile the next batch of requests from EGMs as represented by empty list 740.

The handling of the batch of RNs on RNG service 405 then continues with a batch of RNs being generated by RNG service 405 at step 745. The batch of RNs is sent from RNG service 405 to SBG service 410 in a single transmission at step 750, and subsequently the individual RNs are sent to the EGMs at step 755. The RNs can be stored at RNG system 210 as part of step 745 when they are generated. They can also be stored at both the receiving SBG system 220 and EGM 100 on which the RN is used (step 760). Upon receipt by the EGMs, the RNs are used to complete game at step 765. The EGMs also send the arrival time $t^a_i$ back to SBG service 410 at step 770. Using this information and the original time t of the i-th request, SBG service 410 updates the response time list 715*b* at step 775 to include the most recent information about performance of the system and quality of the data connection.

In addition to updating the response time list 715 after measuring the response time $\tau_i$, response time list 715 may be actively managed (i.e. evaluate it statistically and update it based on the result). An example of active management would be: if it is observed that for a significant percentage of EGMs from different locations the $\tau_i$ values show a sudden increase, it may be assumed that there is a global performance or connection problem. In this case it is reasonable to also increase the response time for EGMs that were not measured to have increased $\tau_i$ (this can happen if either the EGMs are not used, or if the quality of the connection to SBG service 410 is above average).

Figure 8:
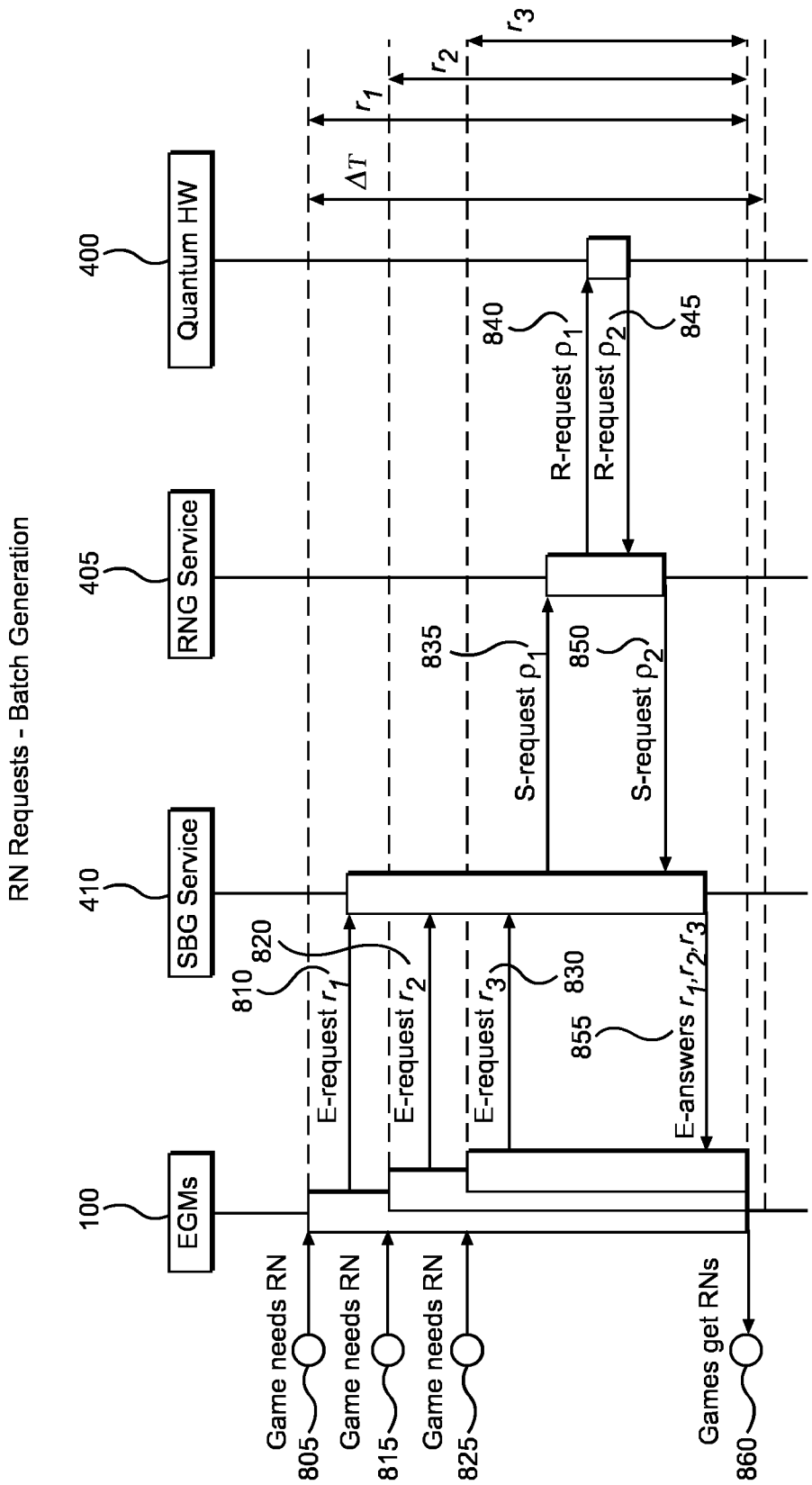
FIG. 8 is a diagram showing the time intervals for RN requests for RNs provided in batches.

FIG. 8 is a sequence diagram showing the interactions between the components participating in the delivery of RNs according to the batching requests solution. As can be seen from the diagram, when a first game is being played on a first EGM 100 and a random number is required 805, EGM 100 transmits a request 810 to SBG service 410. A second game being played on a second EGM 100 that may have begun at a time slightly later than the start of the first game but which is in process at the same time as the first game also requires a RN 815, and sends a second request 820 to SBG service 410. And, a third game being played on a third EGM 100 which is also in process at the same time as the first and second games, requires a RN 825 and sends a third request 830 to SBG service 410. As the three requests are received at SBG service 410, they are gathered together and sent as a single batch request 835 to RNG service 405 for handling. RNG service 405 issues a request 840 to Quantum HW 400 to generate three RNs. The three RNs are generated and sent back at step 845 to RNG service 405 in a batch where they are relayed through SBG service 410 at step 850 and then routed to the appropriate EGM 100 at step 855. Each EGM 100 receives one of the RNs from the batch at step 860. As can be seen in FIG. 8, all requests are answered before the maximum allowed latency time, $\Delta T$, expires. Individual response times, $r_1$, $r_2$ and $r_3$ are also shown in the diagram. It should be understood that for purposes of this description, a set of three RNs are shown as a batch. However, in a system with hundreds or thousands of EGMs, it is expected that the number of RNs in a batch would be far greater, numbering in the hundreds or even thousands of RNs. A typical value of $\Delta T$ for operation in a system as depicted in the figures would be approximately 400 ms+/−1000 ms. The response times are typically in an approximate range of 1000 ms≤$r_i$≤2000 ms.

Figure 9:
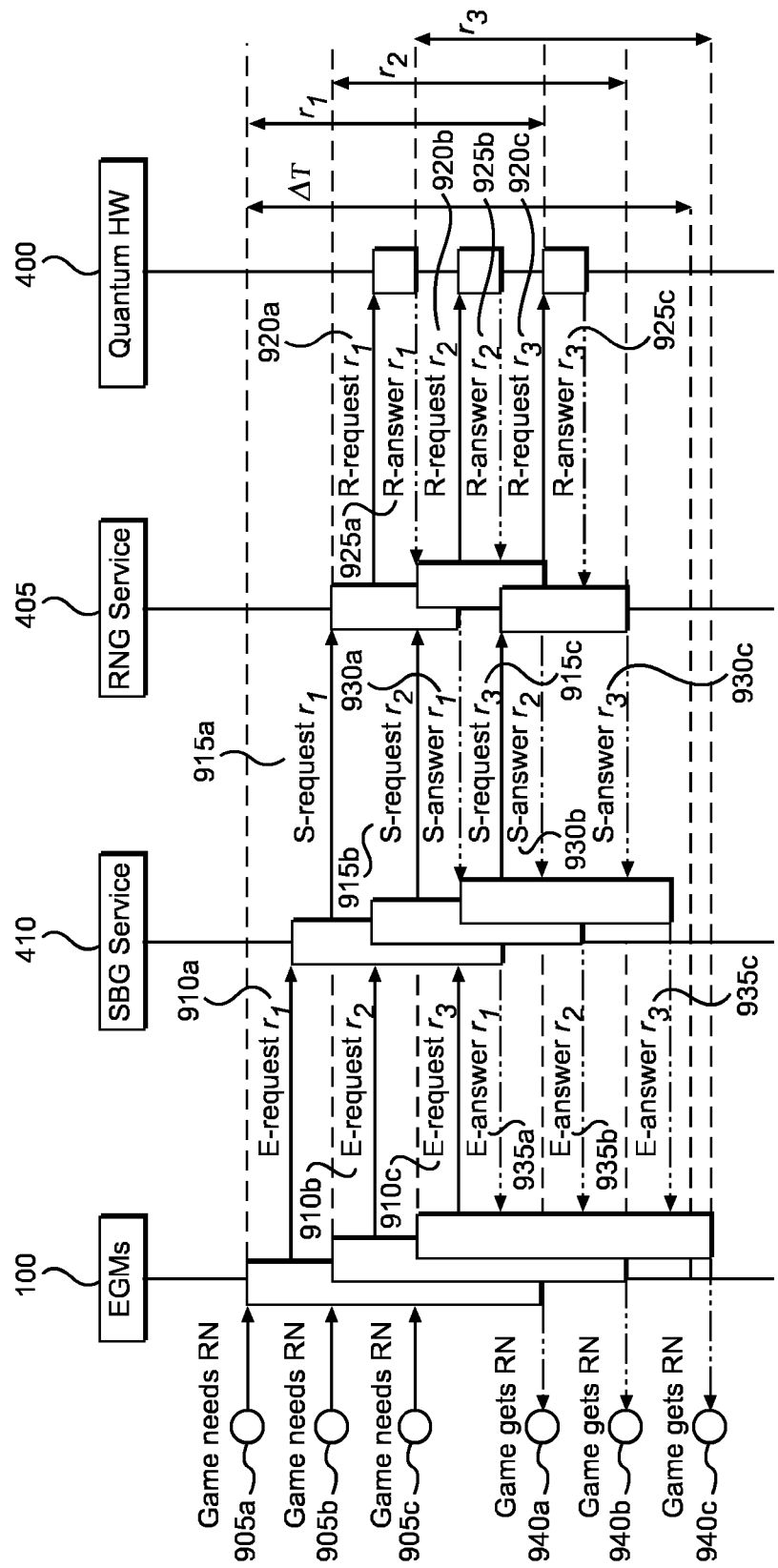
FIG. 9 is a diagram showing the time intervals for real-time RN requests for RNs that are not provided in batches.

FIG. 9 is a sequence diagram showing the interactions between the components participating in the delivery of RNs according to a solution without batching. As can be seen from the diagram, when a first game is being played on an EGM 100 and a random number is required 905*a*, EGM 100 transmits a request 910*a* to SBG service 410. A second game being played on a second EGM 100 that is in process at the same time as the first game also requires a RN 915*b*, and sends a second request 915*b* to SBG service 410. And, a third game being played on a third EGM 100 at the same time as the first and second games requires a RN 905*c*, and sends a third request 910*c* to central SBG service 410. Each of the three requests is received at SBG service 410 at different times which causes an individual request for each RN to be sent from SBG service 410 to RNG service 405 for handling at steps 915*a*, 915*b*, 915*c*, respectively. In the order received, RNG 405 issues individual RN requests to Quantum HW 400 to generate an individual RN for each of the three requests 920*a*, 920*b* and 920*c*. The three RNs are individually generated and sent back to RNG service 405 respectively at steps 925*a*, 925*b* and 925*c* where they are relayed through central SBG service 410 at steps 930*a*, 930*b* and 930*c* and then routed to the appropriate EGM 100 at steps 935*a*, 935*b* and 935*c*. Each EGM 100 receives an RN from the batch at step 940*a*, 940*b* and 940*c* respectively. As can be seen in FIG. 9, also in this case each individual request is answered before the maximally allowed latency time, $\Delta T$. Individual response times, $r_1$, $r_2$ and $r_3$ are also shown in the diagram which clearly shows that in cases where the solution without batching can be used (i.e. if the overflow on the SBG service nodes and on the RNG service nodes is mitigated by other means like horizontal scaling with load balancers), the individual response times $r_i$ are shorter than in the solution with batching. It should be understood that for purposes of this description, a set of three RNs are shown being individually handled. However, in a system with hundreds or thousands of EGMs, it is expected that the number of RNs being processed individually would be far greater, numbering in the hundreds or even thousands of RNs.

While the invention has been described with respect to the figures, it will be appreciated that many modifications and changes may be made by those skilled in the art without departing from the spirit of the invention. Any variation and derivation from the above description and drawings are included in the scope of the present invention as defined by the claims.

What is claimed is:

1. A system in which a plurality of electronic gaming machines ("EGMs") are connected on a network wherein players are enabled to play games on the EGMs with an opportunity to win an award, comprising:
a first central server in communication with the network, comprising:
a true random number generator ("TRNG") for generating random numbers ("RNs") that determine the outcome of games played on EGMs on the network wherein each game outcome resulting from a corresponding RN is one of a predefined set of game outcomes including winning and losing outcomes; and
a true random number generator request handler ("TRNGRH") for handling RN batch requests with individual RN requests received on the network from the EGMs or from a service acting as an abstraction layer, and coordinating the transmission of RNs generated by the TRNG on the network;
at least one server based gaming ("SBG") server in communication with the network wherein an abstraction layer is configured for: (a) receiving individual RN requests from at least a first group of EGMs that is a subset of the plurality of EGMs, and accumulating the RN requests in a request list that forms a batch of RN requests; (b) parsing, in the time intervals $\Delta t \ll \min(\Delta T, \delta T)$, the request list and determining whether an equation $t+\tau_i \geq t_i - \delta T$, is fulfilled for any of the RN requests; (c) upon the equation being fulfilled for any i, sending the batch of RN requests to the TRNGRH for handling and response; receiving a response to the batch request sent to the TRNGRH including a RN corresponding to each RN request in the batch; and (d) transmitting each RN request in the batch to the appropriate EGM in response to each individual request received from the EGMs; and
wherein
i is an integer for counting RN requests;
t is a running time variable in the system;
$\tau_i$ is an expected response time for a particular EGM to receive a RN;
$t_i$ is the latest arrival time at which a particular request for a RN made on EGM i may be answered;
$\delta T$ is an operator defined value set to cover an unexpected level of fluctuation; and
$\Delta T$ is the maximum allowable latency time between request and receipt of a RN on the EGM.

2. The system of claim 1 wherein the true random number generator comprises:
a light source for generating at least one photon within a light beam;
at least one detector detecting photons and for providing detector signals based on detected photons;
at least two photon detectors measuring spatial resolution;
an optical subsystem comprising:
a triggering device for generating a series of single photons; and
an acquisition device for receiving detector signals from the detectors and, in response to the detector signals, generating random numbers.

3. The true random number generator of claim 2 further comprising a processing and interfacing subsystem for performing operational checks on the true random number generator before a random number is output.

4. The system of claim 1 further comprising at least one RNG service memory for storing RNs generated by the TRNG.

5. The system of claim 1 further comprising at least one SBG service memory associated with each SBG service for storing RNs received by each SBG service.

6. The system of claim 1 further comprising at least one additional central TRNG in communication with the network comprising:
a true random number generator ("TRNG") for generating random numbers ("RNs") that determine the outcome of games played on EGMs on the network wherein each game outcome resulting from a corresponding RN is one of a predefined set of game outcomes including winning and losing outcomes;
a true random number generation request handler ("TRNGRH") for handling RN batch requests with individual RN requests received on the network from the EGMs or from a service acting as an abstraction layer, and coordinating the transmission of a batch of RNs generated by the TRNG on the network; and
wherein the at least one additional central TRNG is configured to handle RN generation in parallel with the first central TRNG such that together the first central TRNG and the at least one additional central TRNG supply RNs for the system.

7. The system of claim 6 further comprising at least one additional TRNG in communication with a TRNGRH to increase the number of RNs generated in the system and reduce the associated $\tau_i$.

8. A method of delivering random numbers in response to requests from a plurality of electronic gaming machines ("EGM's") connected on a network wherein players are enabled to play games on the EGMs with an opportunity to win an award and where a central system including a true random number generator ("TRNG"), a true random number generation request handler ("TRNGRH") service and a SBG service, is in communication with the EGMs on the network, comprising:
transmitting requests for random numbers ("RN") from EGMs requiring RNs for determining game outcomes;
receiving the requests for RNs at a SBG service and adding the requests for RNs to a batch of RN requests;
parsing, in the time intervals $\Delta t \ll \min(\Delta T, \delta T)$, the requests and determining whether an equation $t+\tau_i \geq t_i - \delta T$, is fulfilled for any of the RN requests;
upon the equation being fulfilled for any i transmitting a batch request from the SBG service to the TRNGRH;
receiving the batch request at the TRNGRH and requesting a batch of RNs from the TRNG;
generating a batch of RNs on the TRNG and providing the batch of RNs to the TRNGRH;
transmitting the batch of RNs from the TRNGRH to the SBG service;
receiving the batch of RNs at the SBG service;
transmitting RNs from the SBG service to the EGMs that requested RNs for determining game outcomes; and
wherein i is an integer for counting RN requests;

t is a running time variable in the system;

$\tau_i$ is an expected response time for a particular EGM to receive a RN;

$t_i$ is the latest arrival time at which a particular request for a RN made on EGM i may be answered; and $\delta T$ is an operator defined value set to cover an unexpected level of fluctuation, and i is the maximum allowable latency time between request and receipt of a RN on the EGM.

9. The method of claim 8 wherein the true random number generator comprises:
a light source for generating at least one photon within a light beam;
at least one detector detecting photons and for providing detector signals based on detected photons;
at least two photon detectors measuring spatial resolution;
an optical subsystem comprising:
a triggering device for generating a series of single photons; and
an acquisition device for receiving detector signals from the detectors and, in response to the detector signals, generating random numbers.

10. The true random number generator of claim 9 further comprising a processing and interfacing subsystem for performing operational checks on the true random number generator before a random number is output.

11. The method of claim 8 further comprising storing RNs generated by the TRNG in a central server memory.

12. The method of claim 8 further comprising storing RNs received at the SBG service in a SBG service memory.

13. The method of claim 8 wherein the TRNG comprises:
a plurality of true random number generators ("TRNGs") for generating random numbers ("RNs") that determine the outcome of games played on EGMs on the network wherein each game outcome resulting from a corresponding RN is one of a predefined set of game outcomes including winning and losing outcomes;
a random number generation request handler ("TRNGRH") for handling RN batch requests including individual RNs received on the network from the EGMs and coordinating the transmission of a RN batch request generated by the TRNG on the network; and
wherein the plurality of TRNGs are configured to handle RN generation in parallel.

14. The method of claim 13 wherein the plurality of TRNGs increases the number of RNs generated in the system and reduces the associated $\tau_i$.

15. A system in which a plurality of electronic gaming machines ("EGMs") are connected on a network wherein players are enabled to play games on the EGMs with an opportunity to win an award, comprising:
a first central server in communication with the network, comprising:
a true random number generator ("TRNG") for generating random numbers ("RNs") that determine the outcome of games played on EGMs on the network wherein each game outcome resulting from a corresponding RN is one of a predefined set of game outcomes including winning and losing outcomes; and
a true random number generator request handler ("TRNGRH") for handling single RN requests with individual RN requests received on the network from the EGMs or from a service acting as an abstraction layer, and coordinating the transmission of RNs generated by the TRNG on the network;
at least one server based gaming ("SBG") service in communication with the network wherein an abstraction layer is used, for: (a) receiving individual RN requests from at least a first group of EGMs that is a subset of the plurality of EGMs; (b) parsing, in the time intervals $\Delta t \ll \min(\Delta T, \delta T)$, the requests and determining whether an equation $t+\tau_i \geq t_i - \delta T$, is fulfilled for any of the RN requests; (c) upon the equation being fulfilled for any i, sending each RN request to the TRNGRH for handling and response; (c) receiving a response to the RN request sent to the TRNGRH including a RN; and (d) transmitting each RN to the appropriate EGM in response to each individual request received from the EGMs; and
wherein
i is an integer for counting RN requests;
t is a running time variable in the system;
$\tau_i$ is an expected response time for a particular EGM to receive a RN;
$t_i$ is the latest arrival time at which a particular request for a RN made on EGM i may be answered;
$\delta T$ is an operator defined value set to cover an unexpected level of fluctuation; and
$\Delta T$ is the maximum allowable latency time between request and receipt of a RN on the EGM.

16. The system of claim 15 wherein the true random number generator comprises:
a light source for generating at least one photon within a light beam;
at least one detector detecting photons and for providing detector signals based on detected photons;
at least two photon detectors measuring spatial resolution;
an optical subsystem comprising:
a triggering device for generating a series of single photons; and
an acquisition device for receiving detector signals from the detectors and, in response to the detector signals, generating random numbers.

17. The true random number generator of claim 16 further comprising a processing and interfacing subsystem for performing operational checks on the true random number generator before a random number is output.

18. The system of claim 15 further comprising at least one RNG service memory for storing RNs generated by the TRNG.

19. The system of claim 15 further comprising at least one additional central TRNG in communication with the network comprising:
a true random number generator ("TRNG") for generating random numbers ("RNs") that determine the outcome of games played on EGMs on the network wherein each game outcome resulting from a corresponding RN is one of a predefined set of game outcomes including winning and losing outcomes;
a true random number generation request handler ("TRNGRH") for handling RN requests received on the network from the EGMs or from a service acting as an abstraction layer and coordinating the transmission of a response with an individual RN generated by the TRNG on the network; and
wherein the at least one additional central TRNG is configured to handle RN generation in parallel with the first central TRNG such that together the first central TRNG and the at least one additional central TRNG supply RNs for the system.

20. The system of claim 19 further comprising at least one additional TRNG in communication with a TRNGRH to increase the number of RNs generated in the system and reduce the associated $\tau_i$.

* * * * *

UNITED STATES PATENT AND TRADEMARK OFFICE
CERTIFICATE OF CORRECTION

PATENT NO. : 9,785,408 B2
APPLICATION NO. : 14/765474
DATED : October 10, 2017
INVENTOR(S) : Bogdan Pirvu et al.

Page 1 of 1

It is certified that error appears in the above-identified patent and that said Letters Patent is hereby corrected as shown below:

In the Claims

Column 15, Lines 8-9, Claim 8:
After "level of fluctuation, and"
Delete "$i$ is the maximum allowable latency time" and
Insert -- $\Delta T$ is the maximum allowable latency time --

Signed and Sealed this
Nineteenth Day of December, 2017

Joseph Matal
*Performing the Functions and Duties of the
Under Secretary of Commerce for Intellectual Property and
Director of the United States Patent and Trademark Office*